(12) United States Patent
Sekine et al.

(10) Patent No.: US 6,982,070 B2
(45) Date of Patent: *Jan. 3, 2006

(54) PROCESS FOR SYNTHESIZING SPINEL TYPE SILICON NITRIDE POWDERS

(75) Inventors: Toshimori Sekine, Ibaraki (JP); Hongliang He, Ibaraki (JP); Takamichi Kobayashi, Ibaraki (JP)

(73) Assignee: National Institute for Materials Science, Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/108,379

(22) Filed: Mar. 29, 2002

(65) Prior Publication Data

US 2003/0186800 A1    Oct. 2, 2003

(51) Int. Cl.
*C01B 21/68* (2006.01)

(52) U.S. Cl. ..................... 423/344; 501/97.1
(58) Field of Classification Search ................ 423/344; 501/97.1
See application file for complete search history.

(56) References Cited

U.S. PATENT DOCUMENTS 3,881,904 A * 5/1975 Stokes et al. .................. 65/43
3,950,464 A * 4/1976 Masaki ........................ 264/668
5,362,691 A * 11/1994 Wotting et al. ............. 501/97.1
6,589,899 B2 * 7/2003 Sekine et al. ............... 501/98.1

OTHER PUBLICATIONS

Zerr, A., et al. "Synthesis of cubic silicon nitride", Nature, vol. 400 (Jul. 22, 1999), pp. 340-342.
Schwarz, M., et a. "Spinel-$Si_3N_4$:Multi-Anvil Press Synthesis and Structural Refinement", Advanced Materials, vol. 12, No. 12 (2000), pp. 883-887.

* cited by examiner

*Primary Examiner*—Ngoc-Yen Nguyen

(74) *Attorney, Agent, or Firm*—Wenderoth, Lind & Ponack, L.L.P.

(57) ABSTRACT

A large amount of spinel type silicon nitride powders of a high-pressure phase is produced by mixing raw powders having a particle size of 10 μm or less of α-, β- or amorphous silicon nitride, each of which is a low pressure phase, with non-nitrified metal powders at a ratio of 50 weight % or more, preferably copper powders with a particle size of 100 μm or less, forming a compact with porosity of 50% or less and 10% or more, preferably around 30%, by pressing mixture powders obtained, and subjecting the compact to shock wave compression treatment at a pressure of 20 GPa or more, preferably around 60 GPa.

2 Claims, 2 Drawing Sheets

PROCESS FOR SYNTHESIZING SPINEL TYPE SILICON NITRIDE POWDERS

BACKGROUND OF THE INVENTION

1. Field of the Invention

The present invention relates to a process for synthesizing a large amount of spinel type silicon nitride powders of a high-pressure phase, which has been unknown so far. The present invention particularly relates to a process for synthesizing spinel type silicon nitride powders by converting silicon nitride of a law pressure phase to the one of a high pressure phase with shock wave compression treatment.

2. Description of the Prior Art

A synthesizing process of spinel type silicon nitride powders have been a process of reacting Si with $N_2$ fluid in a diamond anvil cell, or a process of pressing and heating silicon nitride powders of low pressure phase such as $\alpha$-$Si_3N_4$, $\beta$-$Si_3N_4$ or amorphous $Si_3N_4$ at 15 GPa or more and 2000 K or more.

In the above-mentioned conventional processes, however, the amount of spinel type silicon nitride powders that can be synthesized at a time is usually about 50 ng that is very slight. It was therefore difficult to obtain a sufficient amount of spinel type silicon nitride powders for their industrial applications or evaluation of their properties.

SUMMARY OF THE INVENTION

An object of the present invention is to solve the above-mentioned defect by using a technique that makes it possible to obtain a sufficient amount of a sample, for example, a technique that can obtain a sample in amount of a kg order such as shock wave treatment using explosives. Another object of the present invention is to improve a conversion ratio of spinel type silicon nitride powders of high-pressure phase.

These and other objects, features and advantages of the invention will be more apparent upon a reading of the following detailed description and drawings.

After several tries and errors, a new fact is found. A large amount of spinel type silicon nitride powders of a high pressure phase can be produced by mixing raw powders having a particle size of 10 $\mu$m or less of $\alpha$-, $\beta$- or amorphous silicon nitride, each of which is a low pressure phase, with non-nitrified metal powders at a ratio of 50 weight % or more, preferably copper powders with a particle size of 100 $\mu$m or less, forming a compact with porosity of 50% or less and 10% or more, preferably around 30%, by pressing mixture powders obtained by a former step, for example, pressing them in a metal using a press machine, and subjecting the compact to shock wave compression treatment at a pressure of 20 GPa or more, preferably around 60 GPa.

The silicon nitride powders as a raw material are preferably highly crystalline $\beta$-silicon nitride with a particle size of a submicron order. This is because reactivity is enhanced according to a limit of reaction time of shock wave compression treatment.

The non-nitrified metal referred to the present invention is a metal that changes no metal nitride or does not easily changes a metal nitride through reaction with silicon nitride. The reasons why the mixture powder containing the non-nitrified metal is used is that pressure and temperature generated by the shock wave compression treatment are distributed as uniformly as possible and that coexistence of the non-nitrified metal makes it possible to apply silicon nitride powders to higher pressure. As above-mentioned, it is necessary that a mixing ratio of the non-nitrified metal is 50 weight % or more. If the mixing ratio of the non-nitrified metal is less than 50 weight %, temperature rise by the shock wave compression treatment causes decomposition of silicon nitride, which results in difficult collection of a product. Even if the mixing ratio of the non-nitrified metal is 99.99 weight %, conversion of silicon nitride is thought to be possible in principle. On the other hand, when the mixing ratio of the non-nitrified metal increases, the amount of spinel type silicon nitride is reduced so that conversion efficiency deteriorates. In the light of this fact, the mixing ratio of the non-nitrified of around 90 weight % is preferable.

Copper powders are most suitable for the non-nitrified metal in view of the shock wave compression treatment or subsequent removal of the non-nitrified metal powders from a product collected. Platinum or gold powders may be also used for the non-nitrified metal powders.

The porosity of a compact is important for controlling temperature rise during the shock wave compression treatment. For example, larger porosity leads to such causes as higher temperature, decomposition of silicon nitride and breakage of a sample vessel due to fusion. On the other hand, smaller porosity results in insufficient temperature rise and delay of reaction based on it.

It is noted that as a shock wave pressure is larger, the porosity is smaller. This is because temperature rise during the shock wave compression treatment is higher according to a higher pressure. A shock wave pressure is required to be 20 GPa or more. In order to obtain a high yield, the shock wave pressure of around 60 GPa is needed. However, when the shock wave pressure is too high, silicon nitride decomposes or starts to melt, which results in difficulty of collecting a product.

EMBODIMENTS OF THE INVENTION

The present invention can be attained by specifying initial sample states and conditions of shock wave compression environment when a material is synthesized under a high-temperature and high-pressure state that is generated by instantaneous shock wave compression. The high-temperature and high-pressure state, for example, can be realized in a high-speed collision device such as a propellant gun or a gas gun, or an shock wave compression treatment device to which an explosive is applied.

With respect to the initial sample states, important factors are selection of starting materials, presences or absence of metal powders such as copper powders, apparent density of a compact and distribution of pores in the compact.

The starting materials are preferably fine and good crystalline powders with a particle size of 10 $\mu$m or less. Mixture powders with metal powders such as copper powders are effective not only for uniform shock wave conditions but also for enhancement of shock wave pressure. Meta powders that do not react with silicon nitride are inevitable and copper is optimal among metals. A sample vessel must protect a sample from damages caused by shock waves in shock wave compression treatment. In general, the sample vessel is made of stainless steel or copper.

Density of a compact obtained from the mixture powders by pressing is essential for controlling temperature rise during shock wave compression treatment. A density range of from 50% to 80% of the theoretical density is suitable for suppressing decomposition of silicon nitride as well as for enhancing reaction rate. The density corresponds to a porosity of from 50% to 20%. Pores in the compact are preferably distributed as uniform as possible. For this purpose, a particle size of the metal powders is preferably 50 $\mu$m or less.

For conditions of shock wave compression environment, a pressure of 20 GPa or more is necessary. When a pressure is 80 GPa or more, a product is likely to be not easily collected during releasing a pressure. A temperature during shock wave compression treatment is preferably in a range of from 1000° C. to 3000° C., which is thermodynamically calculated from porosity and shock wave pressure. Compression time depends on a method of generating shock waves, but generally, it is preferably as long as possible. The release of a pressure is preferably performed by rapid cooling. However, the release of a pressure will not matter seriously by adopting ordinary shock wave compression treatment.

Figure 1:
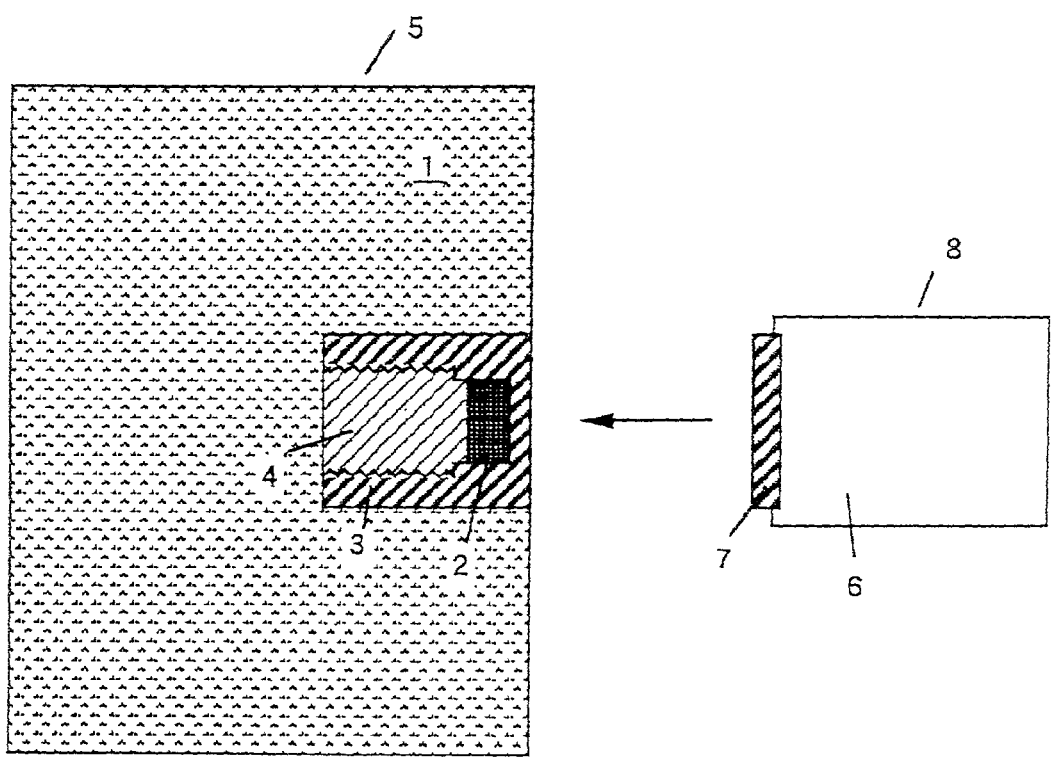
FIG. 1 is a sectional side view illustrating an embodiment of a device that can perform a process of the present invention.

FIG. 1 is a schematic illustrating generation of shock waves and disposition of a sample for shock wave compression treatment. A sample compact 2 is put in a collecting vessel 3 made of stainless steel for protecting the sample compact 2 from damage caused by shock waves. The sample compact 2 is settled at the place in the collecting vessel 3 by a screw lid 4 made of stainless steel. Thereafter, the collecting vessel 3 is embedded in a big cylindrical housing 1. Thus, a target 5 is formed.

A flying body 8 is accelerated with an propellant gun (not illustrated) in order to generate shock waves by collision of a high-speed flying body 8. In the flying body 8, a flying plate 7 made of a metal is fitted to a front face of a servo 6 made of high-density polyethylene in order to enhance an shock wave pressure.

Appearance density of a sample compact made from a mixture powders can be adjusted by increase or decrease of a pressure during pressing. A shock wave pressure is calculated with an impedance matching manner based on a measurement of speed of the flying body 8 just before collision, for example. Temperature rise during shock wave compression treatment is thermodynamically calculated by estimating that a large amount of metal powders and silicon nitride reaches a thermal equilibrium state, for example.

It is possible to synthesize spinel type silicon nitride of a high-pressure phase with a 80% or more conversion ratio from silicon nitride powders of a low pressure phase by way of shock wave compression treatment at a time.

EXAMPLE

In a device as shown in FIG. 1, both a sample vessel 3 and a flying plate 7 was made of stainless steel. A sample compact 2 was made from mixture powders of β-silicon nitride powders in a ratio of 10 weight % and copper powders in a ratio of 90 weight % and the density of it was 5.679 /cm$^3$ with 25% porosity. A flying body 8 was collided with a target 5 at a speed of 2 km/second and shock wave compression treatment of around 50 GPa was performed.

Figure 2:
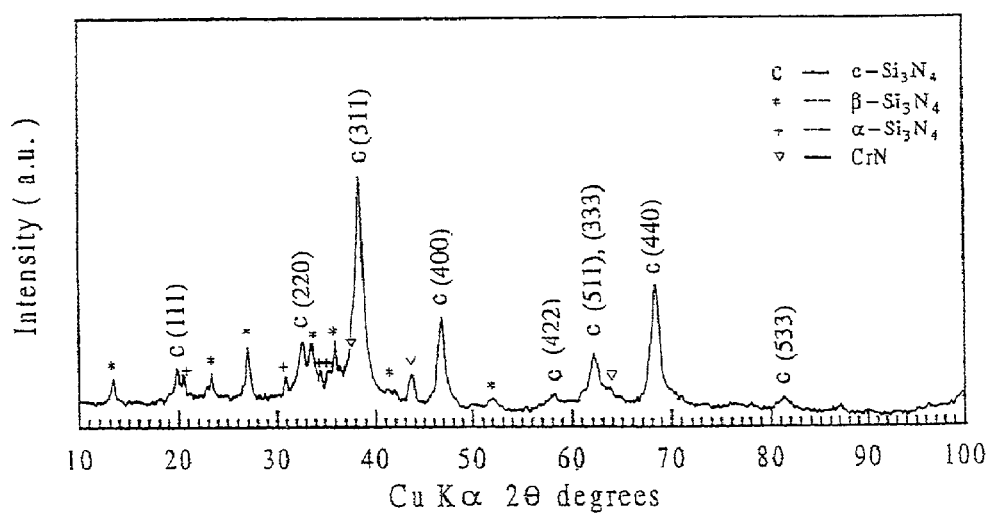
FIG. 2 is a graph showing results of X-ray powder diffraction of a sample collected after shock wave compression treatment.

After the shock wave compression treatment, the sample compact 2 was taken out from the sample vessel 3. The copper powders were removed by acid treatment. The resultant silicon nitride powders were identified by X-ray powder diffraction. The diffraction diagram is shown in FIG. 2. It is confirmed that 80% or more of the resultant silicon nitride is spinel type silicon nitride of cubic system.

In the resultant sample, a very slight amount of β-silicon nitride and CrN are also identified. This demonstrates that parts of non-reacted and/or reacted silicon nitride decompose and nitrogen generated by the decomposition reacts with the sample vessel 3 to form nitrides. It is also understood that temperature during shock wave compression treatment cannot be raised too high by the partial decomposition. On the other hand, when a sample vessel 3 made of copper is used, no CrN is formed.

What is claimed is:

1. A process for synthesizing spinel type silicon nitride powders of a high pressure phase by stress-pressing low-pressure phase silicon nitride powders with shock waves, comprising:

mixing raw powders having a particle size of 10 $\mu$m or less of α-, β- or amorphous silicon nitride, each of which is a low pressure phase, with non-nitrified metal powders at a ratio of 50 weight % or more, to form a powder mixture consisting of α-, β-, or amorphous silicon nitride and metal powders, forming a compact with porosity of 50% or less and 10% or more by pressing the powder mixture, subjecting said compact to shock wave compression treatment at a pressure of 20 GPa or more, and removing non-nitrified metal powders to recover the spinel type silicon nitride powders.

2. The process for synthesizing spinel type silicon nitride powders according to claim 1, wherein said metal powders are copper powders.

* * * * *